(12) United States Patent
Lamstein

(10) Patent No.: US 7,765,956 B2
(45) Date of Patent: Aug. 3, 2010

(54) CAT SCRATCHING SYSTEM

(75) Inventor: Aaron M. Lamstein, San Rafael, CA (US)

(73) Assignee: Worldwise, Inc., San Rafael, CA (US)

( * ) Notice: Subject to any disclaimer, the term of this patent is extended or adjusted under 35 U.S.C. 154(b) by 584 days.

(21) Appl. No.: 11/024,399

(22) Filed: Dec. 23, 2004

(65) Prior Publication Data

US 2006/0137623 A1    Jun. 29, 2006

(51) Int. Cl.
*A01K 29/00*    (2006.01)

(52) U.S. Cl. ..................................... 119/706

(58) Field of Classification Search ............... 119/702, 119/707–711, 706
See application file for complete search history.

(56) References Cited

U.S. PATENT DOCUMENTS

| | | | |
|---|---|---|---|
| 342,885 A | | 6/1886 | Thompson et al. |
| 2,033,526 A | | 3/1936 | Kinkenon |
| 2,067,660 A | | 1/1937 | Eiseman |
| 3,100,474 A | * | 8/1963 | Schneider ................. 119/166 |
| 4,030,448 A | * | 6/1977 | Nuttall ....................... 119/165 |
| 4,117,804 A | * | 10/1978 | Moore et al. .............. 119/166 |
| 5,080,042 A | * | 1/1992 | Rubin ........................ 119/706 |
| 5,363,808 A | * | 11/1994 | Edwards .................... 119/166 |
| 5,572,955 A | | 11/1996 | Boshears |
| 5,615,638 A | | 4/1997 | Thornton |
| 5,749,317 A | * | 5/1998 | Richey et al. ............. 119/166 |
| 5,799,610 A | * | 9/1998 | Poulos ....................... 119/166 |
| 5,983,831 A | * | 11/1999 | Thompson ................. 119/165 |
| 6,167,840 B1 | * | 1/2001 | White et al. ............. 119/61.53 |
| 6,382,351 B1 | * | 5/2002 | Lastowski .................. 181/295 |
| 7,011,043 B2 | * | 3/2006 | Diep .......................... 119/601 |

OTHER PUBLICATIONS

Smarty Kat Super Scratcher Internet Article dated Mar. 4, 2005 from Worldwise, Inc.

* cited by examiner

*Primary Examiner*—Thomas Price
(74) *Attorney, Agent, or Firm*—Bay Area Technology Law Group PC

(57) ABSTRACT

A cat scratching system for providing at least one surface suitable for cat scratching. This system includes a shell being capable of accepting at least one cat scratching surface having sides, an opening for inserting and removing the first cat scratching surface and a top and bottom. At least one of the surfaces, such as the top, is further characterized as having an open region for displaying the at least first cat scratching surface to the exterior of the shell, the first cat scratching surface being insertable within the opening of the shell.

9 Claims, 2 Drawing Sheets

CAT SCRATCHING SYSTEM

TECHNICAL FIELD OF THE INVENTION

The present invention involves a cat scratching system for providing cat scratching surfaces of various types to a domestic cat. This system includes a shell having an opening in which various cat scratching surfaces, alone, or in connection with a supporting substrate can be inserted.

BACKGROUND OF THE INVENTION

It is well recognized that domestic cats crave scratching as part of their natural instinctive character. If a dedicated scratching surface is not provided, domestic cats will generally satisfy their need to scratch by turning to furniture, curtains and other articles which can be substantially damaged as a consequence. Often times, pet cats will not only climb over furniture, especially upholstered chairs and sofas, but will use such furniture and carpeting to condition their claws through deliberate and repeated clawing, pulling and tearing actions specifically with their fore paws. As noted, this clawing activity appears to be an irresistible natural impulse for cats and can be the source of great aggravation to the pet owner.

A number of vendors of pet and pet related products have offered dedicated scratching posts and surfaces in order to ameliorate this problem. Current devices consist of several alternative designs. A first group of cat scratchers consists of a rigid support covered with a plush surface such as rug or sisal. Such objects are generally in the shape of a post or beam which the cat can climb or otherwise engage during the clawing process. In that the plush surface is bonded to its support, once this surface has been compromised due to the cat's clawing action, the entire post or block must be discarded in its entirety.

Because of the unitary nature of prior cat scratching surfaces, if one wished to present a completely different surface to a cat simply because the cat favored an alternative surface or as a means of adding diversity to the scratching experience, one could not alter such a surface without discarding the entirety of the apparatus while replacing it with an alternative.

In addition, corrugated cardboard surfaces have been employed as scratchers. Many cats find cardboard preferable to carpeting as it is a soft material having corrugations that cats seem to enjoy. Also, the corrugated interstities in the cardboard surface can capture catnip thus further enhancing the scratching experience. However, as noted, corrugated cardboard is an extremely soft material which is easily destroyed with even modest cat scratching activity.

It is thus an object of the present invention to provide a cat scratcher system which can present different scratching surfaces to a domestic cat without the need to completely replace the entire system in order to do so.

A further object of the present invention is to provide a cat scratcher system in which various inserts can be employed to present new scratching surfaces to a pet without changing the entire system by simply changing inserts.

It is yet a further object of the present invention to provide a cat scratcher system in which various scratching surfaces can be replaced as they become compromised and worn without having to replace the entire system.

These and further objects will be more readily apparent when considering the following disclosure and appended claims.

SUMMARY OF THE INVENTION

The present invention involves a cat scratching system for providing at least one surface suitable for cat scratching. The system comprises a shell being capable of accepting at least one cat scratching surface. The shell is provided with sides and an opening for inserting and removing the first cat scratching surface. The shell further has a top and a bottom wherein at least the top and preferably both the top and bottom are characterized as having open regions for displaying the at least first cat scratching surface to the exterior of the shell, the first cat scratching surface being inserted within the opening of the shell.

DETAILED DESCRIPTION OF THE INVENTION

Figure 1:
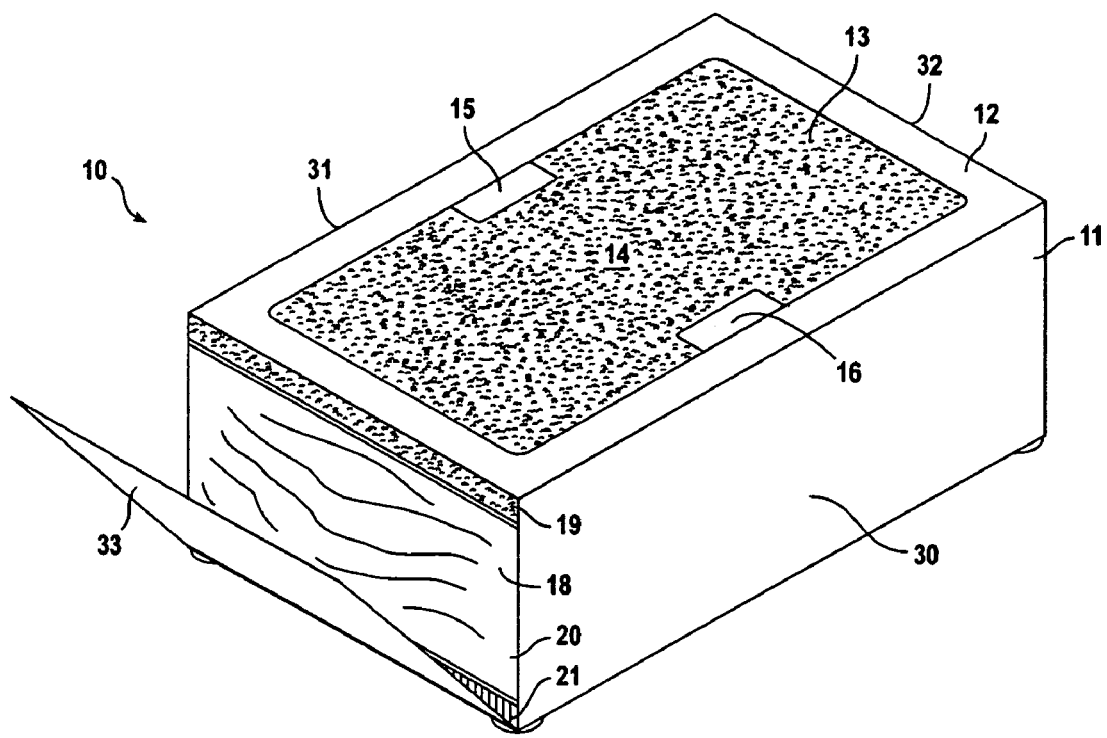
FIG. 1 represents the present invention in perspective view.

Turning to FIG. 1, cat scratcher system 10 is depicted as a substantially rectangular shell 11. Cat scratcher system 10 can actually assume virtually any geometrical configuration although a rectangular shell such as that depicted in FIG. 1 represents the preferred embodiment of the present invention.

Shell 11 can be composed of any durable material such as molded or extruded plastic or wood or virtually any other material which can be configured into a suitable shape and which resists deterioration due to its use as a scratching object for a cat.

The embodiment shown in FIG. 1 comprises four vertically extending side walls 30, 31, 32 and 33 which, together with top 12 and bottom 29 (FIG. 2), delineates the geometry of cat scratcher system 10.

The thrust of the present invention is the ability to provide a reusable shell 11 which can present to a pet cat varying cat scratching surfaces and further have the ability to replace such surfaces as they are worn through the intended cat scratching activity. In carrying out these various objectives, cat scratching system 10 composed of shell 11 is provided with open area 13 configured within top 12. As noted, a suitable cat scratching surface 14 is inserted as element 18 within shell 11 which, due to the creation of opening 13 and top 12, exposes cat scratching surface 14 as depicted.

It is noted by again referring to FIG. 1 that shell 11 is provided with an end flap 33 which can be hingedly swung from its closed position to enable one to access the interior of shell 11. In doing so, various cat scratching surfaces can be applied to the interior of shell 11 which, again, are exposed through opening 13 in top surface 12.

Figure 3:
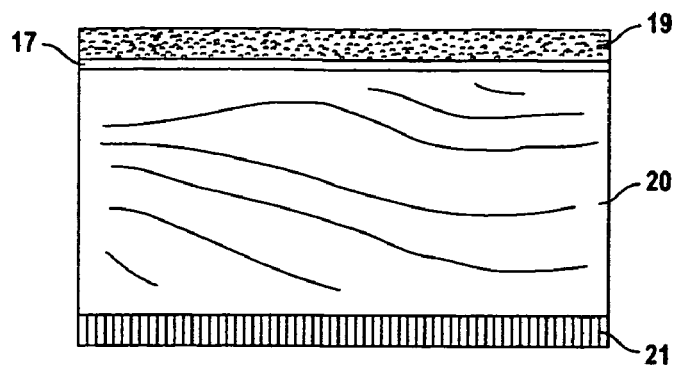
FIG. 3 is a side plan view of a typical insert for use in the cat scratcher system shown in FIG. 1.
Figure 4:
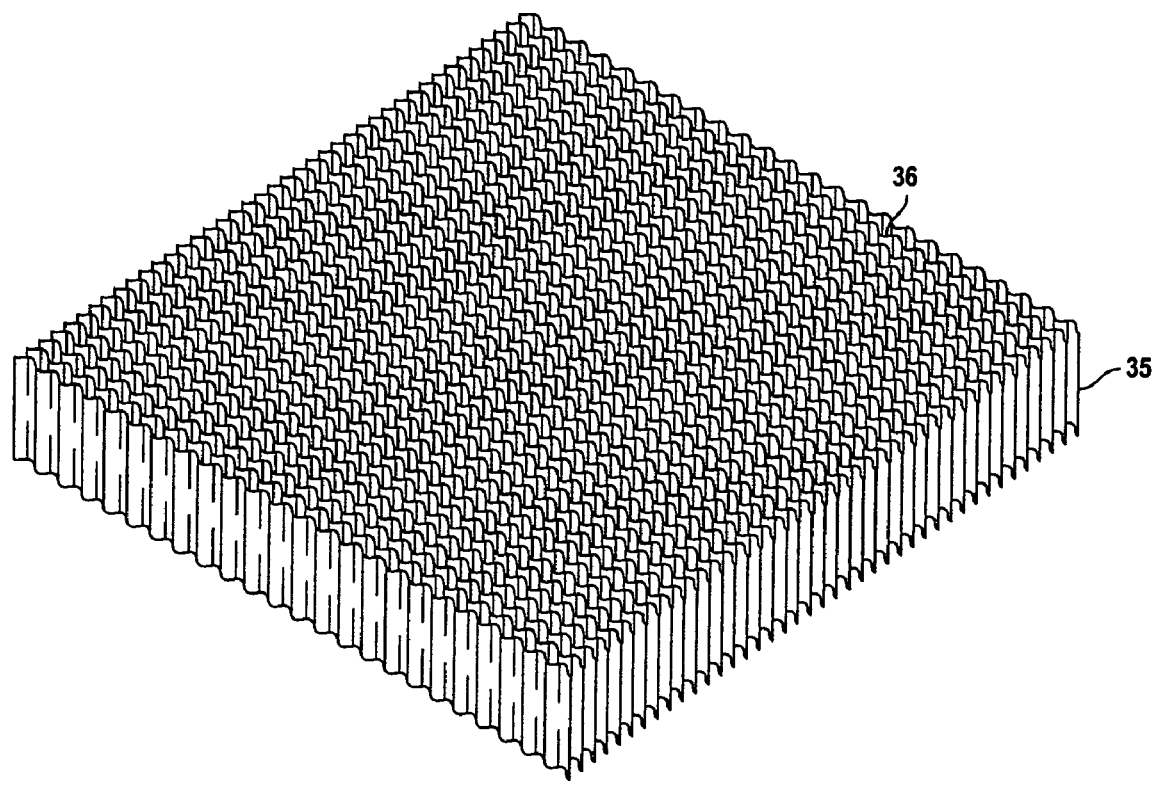
FIG. 4 is a perspective view of an alternative insert for use in the present invention as depicted in FIG. 1.

FIG. 3 shows a typical insert for placement within shell 11. In this instance, a wood backing 20 is adhered to two cat scratching surfaces 19 and 21. Typically, such surfaces include rugs, sisal and cardboard. Although FIG. 3 shows a preferred embodiment for carrying out the present invention, virtually any replaceable cat scratching surface can be included within the interior of shell 11 while keeping within the scope of the present invention. For example, FIG. 4 shows a solid block of corrugated cardboard having end 35 and top surface 36. This solid block of material could be inserted as a whole within the interior of shell 11 without the need for backing material 20 as depicted in FIG. 3. In addition, catnip can be placed within the interstities of top surface 36 or beneath any cat scratching surface such as at the interface 17 between wood block 20 and cat scratching surface 19 in order to enhance the cat scratching activity.

In that it is the tendency of a cat to make every attempt to pull the cat scratching surface from shell 11, care must be taken to secure this surface within the shell material. This is accomplished by providing a lip within top surface 12 which overlaps cat scratching surface 14 to provide a securing border about it. In addition, tabs 15 and 16 as well as tabs 22 and 23 (FIG. 2) can be provided as an optional expedient to further secure cat scratching surface 14 in place. These tabs can be either an extension of the top and bottom surfaces of shell 11 or could be separate appended extensions composed of plastic or other rigid securing materials.

Figure 2:
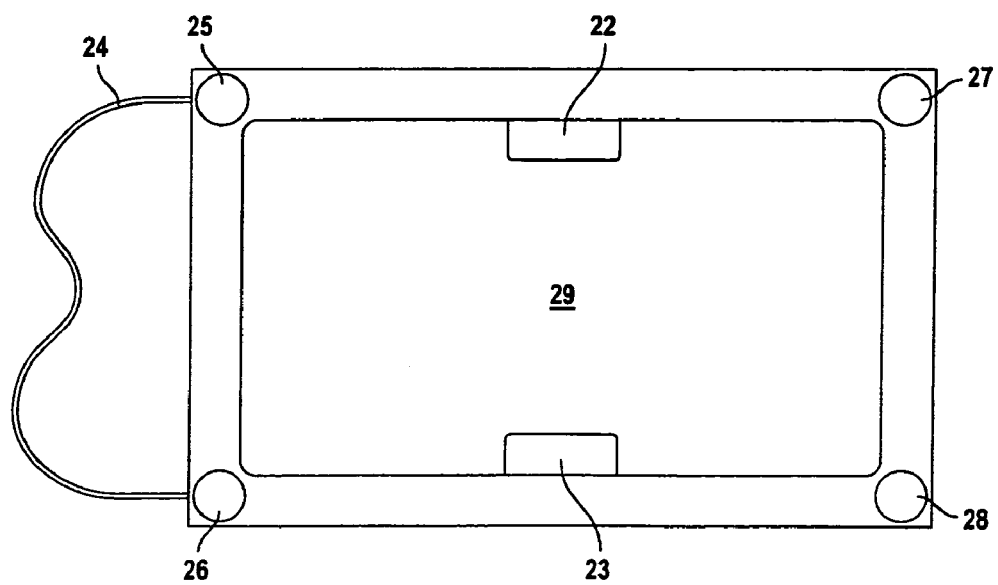
FIG. 2 is a bottom plan view of the cat scratcher system of the present invention.

As noted by reference to FIG. 2, bottom 29 of shell 11 can also be provided with an opening for presenting an additional cat scratching surface to a pet cat. As such, if the insert of FIG. 3 was to be placed within shell 11 by opening flap 33, scratching surface 19 could be provided within opening 13 while scratching surface 21 provided through the opening in bottom 29. As such, a pet cat could have two different surfaces thus enhancing its cat scratching experience while further reducing the wear on one surface noting that the cat scratching activity would be spread over two surfaces.

Although shell 11 could simply be placed upon a floor or other horizontal surface, cat scratching activity tends to become quite vigorous and shell 11 would tend to slide on a horizontal surface unless secure thereto. As such, as further embodiments in practicing the present invention, it is contemplated that shell 11 could be provided with suction cups 25, 26, 27 and 28 within the corners of the bottom of shell 11. Additionally, the cat scratching system of the present invention could be hung from a vertical surface such as a doorknob through the use of string or cord 24.

In summary, for the first time, one wishing to provide a cat scratching surface to a pet can acquire a single reusable shell 11 and maintain that shell as cat scratching inserts are introduced therein. In doing so, a pet cat can be presented with varying scratching surfaces to provide a diverse and more interesting cat scratching experience. Several different surfaces can be provided on a single insert which can be simultaneously presented to the pet by providing shell 11 with openings in both its top and bottom surfaces. Alternatively, an opening could be provided in only a single surface, such as the top surface of the shell and the insert flipped upon itself to provide a second surface again, for expanding the scratching experience or to provide a new surface when the pre-existing one has deteriorated.

The invention claimed is:

1. A cat scratcher system for providing at least one surface suitable for cat scratching, said system comprising a shell, said shell being capable of accepting said at least one cat scratching surface and having sides, a top and a bottom, wherein at least said top is characterized as having an open region for displaying said at least one surface to the exterior of said shell, said shell further comprising an opening for inserting and removing said one surface suitable for cat scratching, said shell further characterized as having a lip within said top surface, wherein said lip surrounds said open region and overlaps said cat scratching surface to substantially resist removal of said cat scratching surface from said open region.

2. The cat scratching surface of claim 1 wherein said at least one cat scratching surface comprises a member selected from the group consisting of carpet, sisal, and corrugated cardboard.

3. The cat scratching surface of claim 1 wherein a quantity of catnip is embedded within said at least one cat scratching surface.

4. The cat scratching surface of claim 1 wherein a quantity of catnip is situated within said shell and beneath said at least one cat scratching surface.

5. The cat scratcher system of claim 1 wherein at least one tab is provided extending from said border and into said open region to further resist removal of said first cat scratching surface from said open region.

6. The cat scratcher system of claim 1 wherein said at least one cat scratching surface is appended to a supporting substrate, said at least one cat scratching surface and supporting substrate being insertable within said shell.

7. The cat scratching system of claim 1 wherein said shell is provided with means for supporting said shell on a supporting surface.

8. The cat scratcher system of claim 7 wherein said means for supporting said shell comprises a member selected from the group consisting of string, wire, cord and suction cups.

9. The cat scratching system of claim 7 wherein said supporting surface comprises a vertical surface.

* * * * *